United States Patent

McConnell

[11] Patent Number: 4,786,089
[45] Date of Patent: Nov. 22, 1988

[54] AUTOMATICALLY LOCKING TUBING COUPLER

[75] Inventor: William W. McConnell, Hagerstown, Ind.

[73] Assignee: Ford Motor Company, Dearborn, Mich.

[21] Appl. No.: 931,769

[22] Filed: Nov. 17, 1986

[51] Int. Cl.[4] .................... F16L 27/08; F16L 37/12
[52] U.S. Cl. .................... 285/281; 285/319; 285/370; 285/921
[58] Field of Search .......... 285/319, 370, 371, 397, 285/398, 921, 281, 275, 334.5, 331, 424

[56] References Cited

U.S. PATENT DOCUMENTS

| | | | |
|---|---|---|---|
| 177,686 | 5/1876 | Buzzell | 285/319 X |
| 442,837 | 12/1890 | Ward | 285/398 X |
| 623,416 | 4/1899 | McCrory | 285/370 X |
| 654,735 | 7/1900 | Jordan | 285/334.5 X |
| 714,243 | 11/1902 | Sargent, Jr. | 285/371 X |
| 758,099 | 4/1904 | Paradice . | |
| 946,703 | 1/1910 | Nelson . | |
| 1,043,683 | 11/1912 | Fieser | 285/319 X |
| 2,035,978 | 3/1936 | Parker | 285/334.5 X |
| 2,924,434 | 2/1960 | Potter et al. . | |
| 3,245,703 | 4/1966 | Manly . | |
| 3,372,949 | 3/1968 | McLay . | |
| 3,455,579 | 7/1969 | Olliff, Jr. et al. | 285/319 X |
| 3,512,805 | 5/1970 | Glatz | 285/398 X |
| 3,588,149 | 6/1971 | Demler, Sr. et al. . | |
| 3,984,133 | 10/1976 | Bird | 285/921 X |
| 4,099,744 | 7/1978 | Kutnyak et al. | 285/921 X |
| 4,123,091 | 10/1978 | Consentine et al. . | |
| 4,214,779 | 7/1980 | Losell . | |
| 4,225,162 | 9/1980 | Dola . | |
| 4,312,551 | 1/1982 | Mascola et al. . | |
| 4,317,471 | 3/1982 | King, Sr. | 285/319 X |
| 4,487,437 | 12/1984 | Dickirson | 285/319 |
| 4,632,435 | 12/1986 | Polyak | 285/319 X |
| 4,682,798 | 7/1987 | Sauer | 285/921 X |

FOREIGN PATENT DOCUMENTS

| | | | |
|---|---|---|---|
| 845563 | 6/1970 | Canada | 285/319 |
| 794639 | 2/1936 | France . | |
| 595001 | 6/1959 | Italy | 285/370 |
| 0100518 | of 1916 | United Kingdom . | |
| 1071978 | 6/1967 | United Kingdom . | |

Primary Examiner—Thomas F. Callaghan
Attorney, Agent, or Firm—Jerome R. Drouillard; Roger L. May

[57] ABSTRACT

An automatically locking tubing coupler includes a barrel adapted to slidably engage with the end regions of two or more lengths of tubing and two or more sets of locking lugs positioned upon the barrel and adapted to automatically grip the lengths of tubing in their end regions when the lengths of tubing are slidably engaged with the locking lugs.

1 Claim, 2 Drawing Sheets

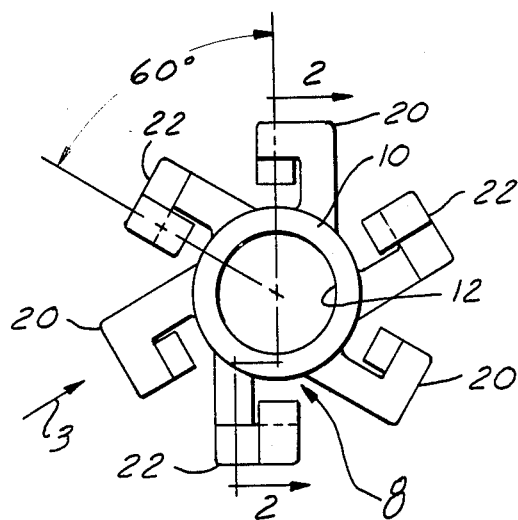
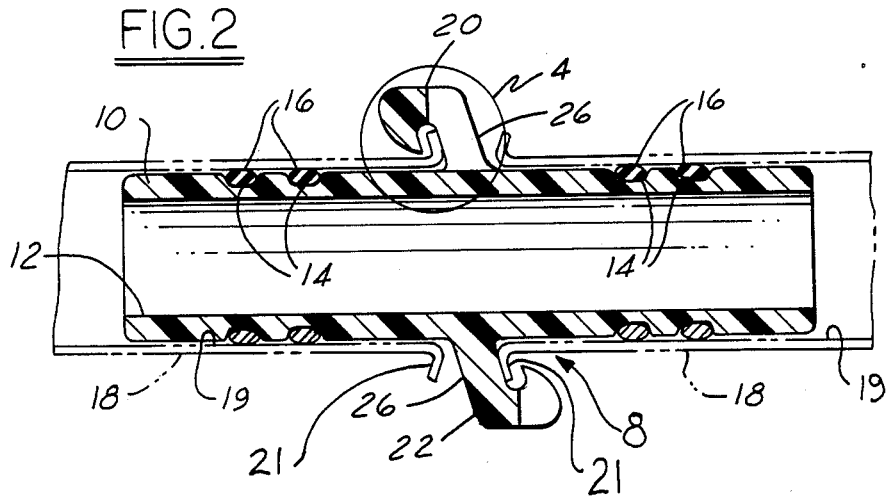
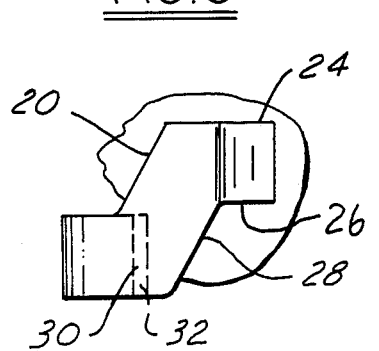

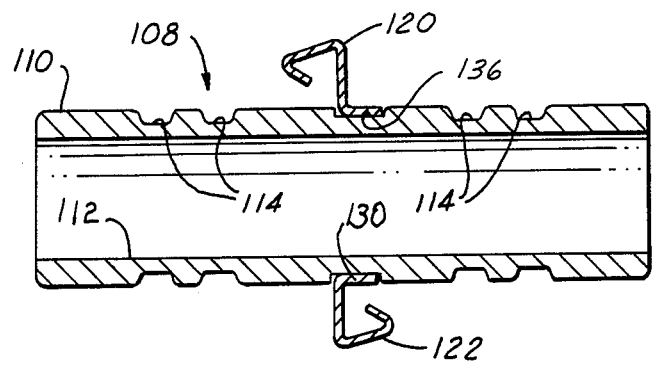
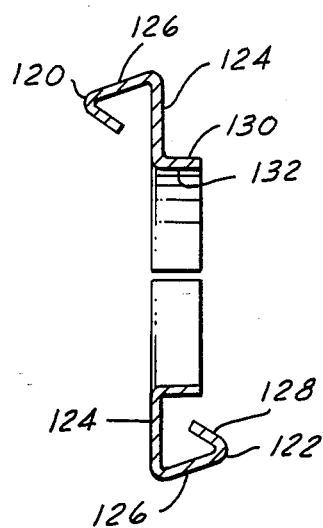
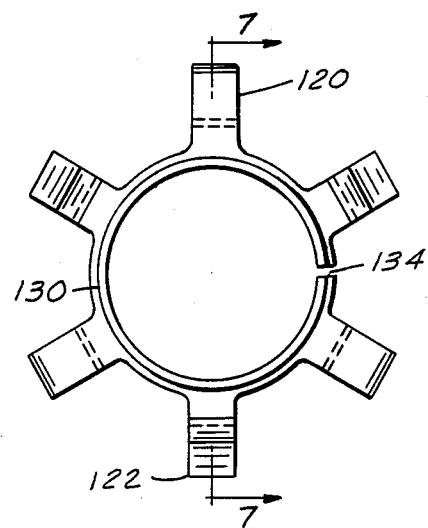
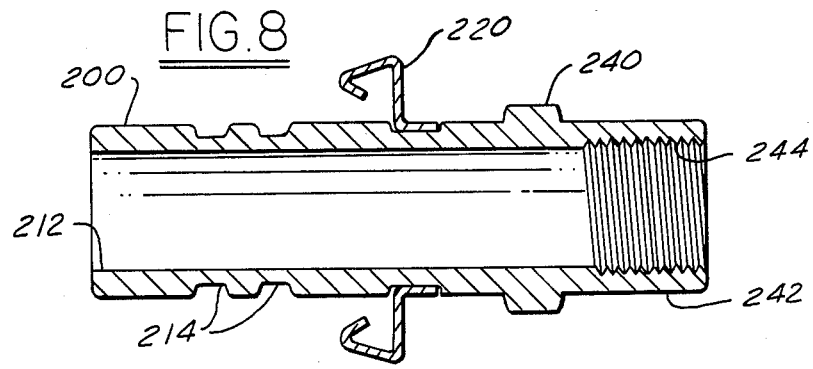

AUTOMATICALLY LOCKING TUBING COUPLER

BACKGROUND OF THE INVENTION

1. Field of the Invention

This invention relates to an automatically locking tubing coupler for attaching one length of tubing to another such length.

2. Disclosure Information

Various devices have been used for the purpose of joining lengths of tubing so as to make mechanically strong and fluid tight joints. Threaded couplings are known in which a ferrule mounted about the exterior of a section of tubing is clamped to a central cylinder or barrel by means of a threaded nut. Although such a device is usually leak tight when properly assembled, errors are easily committed during the assembly process because excessive time and dexterity are required to complete the threaded connections without cross threading the nuts upon the barrel.

Non-threaded connectors have also been employed for the purpose of providing fluid tight connections between tubing lengths. U.S. Pat. Nos. 758,099 and 946,703 as well as British patent No. 0100518 and French patent No. 0794639 all disclose non-threaded couplers involving a central barrel with which the tubing halves to be joined are first engaged, and further including a barbed, plastically deformable spider which is forced into contact with the tubing by means of a hammer or other tool so as to form the completed joint. These devices suffer from the defect that is not always possible to mount the joint in a position allowing the use of the hammer or other tool to fasten the coupling. Another drawback to this particular design stems from the fact that judgment of the hammer operator is required to prevent use of excessive force during the clinching operation. The present invention remedies this deficiency by providing a compact coupling which requires no tool for its final assembly.

U.S. Pat. No. 3,372,949 discloses yet another design for coupling tubes in which the tubes to be joined must be equipped with hubs capable of accepting a cylindrical joint member equipped with O-ring seals. This design is costly and is not suitable for use with thin wall tubing, it being primarily intended for employment with glass laboratory tubing.

U.S. Pat. No. 4,312,551 discloses a pipe fitting for use with electrical conduit in which a nonmetallic coupling is equipped with a metallic conductor strap. No means is disclosed aside from the friction produced by O-rings for axially retaining the joined pipes in registry with the connector. Finally, U.S. Pat. No. 2,924,434 discloses a safety joint for use in oil well drilling. This disclosure is not deemed to be relevant to the present application.

SUMMARY OF THE DISCLOSURE

An automatically locking tubing coupler includes a barrel adapted to slidably engage with the end regions of two or more lengths of tubing. Two or more sets of locking lugs positioned upon the barrel are adapted to automatically grip the lengths of tubing in their end regions when the tubing is slidably engaged with the locking lugs. The barrel preferably comprises a generally cylindrical body having an axial bore therethrough and having two or more external annular grooves for retaining O-rings adapted to sealingly engage with the tubing to be joined.

Each locking lug mounted on the outside surface of the barrel preferably includes a base attached to the barrel, a stem extending outwardly from the barrel, and a barb attached to the stem such that the barb will automatically grip the tubing when the tubing is fully engaged with the barrel. The barbs preferably engage a structure extending radially outwardly from the end region of each of the lengths of tubing. This outwardly extending structure may, for example, comprise an annular flare integrally formed from the tube.

The locking lugs are preferably formed integrally with the barrel or may be applied to the barrel after it has been formed, in which case the lugs may be formed integrally with a collar attached to an outer surface of the barrel.

A coupler according to the present invention may be used in a tubing joint with the barrel inserted coaxially into the end regions of two or more lengths of tubing, with the coupler having one set of lugs oriented so as to automatically grip a radially outwardly directed structure extending from the first of the tubing lengths to be joined, and further having at least one other set of lugs oriented so as to automatically grip a radially outwardly directed structure extending from a second tubing length to be joined. Accordingly, the locking lugs comprise retention means for automatically retaining the tubing lengths in axial registry with the barrel once the barrel has been fully inserted into the end regions of the tubing lengths.

A tube fitting may advantageously be constructed in accord with the present invention to include means for connecting the tube fitting to another tube fitting which means could, for example, comprise a threaded or flared end, with the balance of tube fitting comprising a barrel adapted to be sealingly inserted into the end region of a length of tubing and having a single set of locking lugs positioned upon an exterior surface of the barrel and adapted to automatically grip the exterior surface of a tube engaged with the barrel. As before, the locking lugs are preferably adapted to automatically engage a radially outwardly directed structure extending from the tube. This structure preferably comprises a flare formed integrally with the tube, but may comprise other known structures as well.

It is an object of the present invention to provide an automatically locking tubing coupler which may be assembled without tools.

It is a further object of the present invention to provide an automatically locking tubing coupler which provides rotational freedom in the coupled joint.

It is a further object of the present invention to provide a tubing coupler which occupies little space.

It is an advantage of the present invention that the tubing coupler described herein may be assembled by an operator having little or no training, it not being necessary to exercise any discretion in assembling a joint using the present coupler.

It is a further advantage of the present invention that the means required to maintain the tubing lengths joined by the coupler in axial registry with the coupler's barrel are automatically employed upon insertion of the coupler into the end regions of the tubing to be joined.

Other objects, features, and advantages of the present invention will appear from the following description and the accompanying drawings.

BRIEF DESCRIPTION OF THE DRAWINGS

For the purpose of illustrating the invention, there is shown in the drawings the forms which are presently preferred; it should be understood, however, that the invention is not necessary limited to the precise arrangements here shown. In the accompanying drawings, reference numerals are applied in arithmetic series indicating like items found in the various embodiments.

FIG. 1 represents an axially directed elevational view of a coupler illustrating an embodiment of the present invention.

FIG. 2 represents a sectional view of the coupler shown in FIG. 1, taken along the line 2—2 of FIG. 1.

FIG. 3 represents an elevational view of a locking lug shown in FIG. 1, taken in the direction of arrow 3 of FIG. 1.

FIG. 4 represents an enlarged view of the locking lug shown in circle 4 of FIG. 2.

FIG. 5 represents a second preferred embodiment of the present invention.

FIG. 6 represents an elevational view of the locking lugs and integral collar to which the lugs are attached, from FIG. 5.

FIG. 7 represents a side elevational view of the locking lug assembly shown in FIG. 6, taken along the line 7—7 of FIG. 6.

FIG. 8 represents a sectional view illustrating yet another embodiment of the present invention.

DESCRIPTION OF THE PREFERRED EMBODIMENTS

As shown in FIGS. 1 and 2, a first preferred embodiment of coupler 8 includes a generally cylindrical barrel 10 having an interior bore 12 through which fluid may pass. In the event, however, that it is desired to employ the coupling of the present invention solely as a mechanical coupling without the need to pass fluid through the coupling, interior bore 12 need not be provided.

Exterior annular grooves 14 are provided in the exterior surface of barrel 10 for the purpose of retaining a plurality of sealing O-rings 16. As shown in FIG. 2, O-rings 16 are interposed between annular grooves 14 and interior surfaces 19 of tubes 18, which are shown as being joined by the coupler of FIGS. 1-4. Those skilled in the art will realize in view of this disclosure that fluid tightness afforded by the coupler disclosed herein results from the sealing attributes of O-rings 16. It will be further appreciated in view of this disclosure that other types of sealing means could be provided for the purpose of maintaining an adequate seal between the coupler and the tubing being joined.

As best shown in FIG. 2, tubes 18 are maintained in axial registry with coupler 8 by means of locking lugs 20 and 22, working in concert with annular flares 21. The locking lugs engage flares 21 formed in the end regions of tubes 18. As shown in FIG. 1, a total of six locking lugs is provided. Three lugs 20 engage one of tubes 18, whereas the remaining three lugs 22 engage the other of tubes 18. As shown in FIG. 1, one locking lug is located every 60° about the circumference of the coupler's barrel. Moreover, the lugs are alternated so that adjacent lugs are coupled with alternating tube ends. Those skilled in the art will appreciate in view of this disclosure that it will be possible to employ more than, or, indeed, even fewer than six locking lugs in accord with the present invention.

FIGS. 3 and 4 detail the construction of locking lugs 20 and 22. In each case, the locking lugs comprise base 24 attached to exterior surface of barrel 10, a stem 26 attached to base 24 and extending outward from barrel 10, a cross arm 28 attached to the outboard end of stem 26, and a barb including barb shank 30 and barb point 32. As shown in FIG. 2, flares 21 are positively retained between stem 26 and barb shank 30 when tubes 18 have been placed in full axial registry with coupler 8. The curved nose, 31, of barb shank 30 enables automatic locking of the present coupler because flares 21 are allowed to ride down curved nose 31 to barb point 32 as tubing lengths 18 are slidably engaged with coupler 8. Accordingly, barb point 32, followed by the balance of the barb's shank, will move behind the flare 21, to the locked position shown in FIG. 2.

Plastic deformation of the locking lug during the coupling operation is permitted if the coupler is constructed of material such as any of the durable plastics including such compounds as nylon, polyesters, polyethylenes, and others suggested by this disclosure. Several of these materials will permit the stem and barb to elastically deform during engagement of the tubing lengths 18 with coupler 8, while allowing the locking lugs to then move to the locked position shown in FIG. 2. Those skilled in the art will appreciate in view of this disclosure that alternate configurations may be employed for the locking lugs of the present invention.

A second preferred embodiment is illustrated in FIGS. 5-7 in which barrel 110 having an interior bore 112 and external annular grooves 114 is equipped with a plurality of locking lugs 120 and 122 which are each attached to collar 130. The inside diametral surface 132 of collar 130 contacts annular groove 136 formed in the outside diameter of barrel 110. As shown in FIGS. 6 and 7, collar 130 is provided with a slit 134 which facilitates attachment of collar 132 and barrel 110. Those skilled in the art will appreciate in view of this disclosure that barrel 110 could be constructed of a variety of metallic and nonmetallic materials. Similarly, the collar and integral locking lugs could be fabricated from a variety of metals such as steel, brass, and other metals as well as metallic and nonmetallic composite and noncomposite materials. In any event, as shown in FIG. 7, each locking lug comprises a stem 124 attached to collar 130, a barb shank 126 contiguous with stem 124 and a barb point 128 contiguous with shank 126. The function of the barb point is twofold. First, barb point 128 allows a flare or other suitable structure positioned at the end of a tubing length to displace the locking lug as the tubing length is slidingly engaged with the coupler assembly, so that the flare ultimately comes to rest between barb point 128 and stem 124. The second function of barb point 128 is to prevent subsequent axial disengagement of the tubing lengths from the coupler. As previously noted, in view of this disclosure, those skilled in the art will appreciate that varying numbers of locking lugs as well as alternate designs of the lugs themselves may be employed according to the required performance characteristics of the coupler.

FIG. 8 shows yet another preferred embodiment of the present invention in which a barrel 200 having an interior bore 212 is equipped with external annular grooves 214 for the purpose of accepting O-rings as before. The barrel is further equipped with a plurality of locking lugs 220. In this case, each locking lug is oriented to accept a common flare or other radial projection formed in the end region of a tube. In order to permit engagement of the tube fitting illustrated in FIG. 8 with yet another fitting, the present tube fitting is provided with sleeve 242 including internal threads, 244, which allow the fitting to be threadedly engaged with another tube or pipe fitting. Threaded engagement of barrel 200 with another threaded pipe fitting is promoted by nut 240, which is formed integrally with sleeve 242.

The automatic locking tubing coupler of the present invention may be assembled without tools because the operator making the assembly need only slidingly engage the tubes to be coupled with the coupler. Once the flares 21, or other radially outwardly directed structures attached to the tubes become fully engaged with the locking lugs, the tubes 18 will remain in axial registry with the coupler notwithstanding axially directed forces resulting from either mechanical or fluid pressure. The present coupling requires little space for its employment because no tools are needed for its deployment. The coupler may be easily installed by personnel having little training because the installer need not exercise the discretion demanded by a threaded tightening operation. Further, the tubes being connected are less likely to kink either during assembly operation or due to a variety of causes during their useful life, because the present coupling allows one tube to rotate relative to the other tube. Those skilled in the art will appreciate in view of this disclosure that the tubing being joined need not be of metallic composition, it being understood that non-metallic tubes, which may, for example, be composed of thermoplastic materials, may be processed by techniques such as those involving thermal forming of flares 21, Alternatively, in the case of both metallic and non-metallic tubes, radially outwardly directed structures useful for practicing the present invention could comprise other non-integral components such as ferrules of various shapes, or other integral structures other than flared ends. An alternative integral structure could, for example, comprise an annular flange such as that shown as structure A' in U.S. Pat. No. 946,703, which is hereby incorporated by reference into this specification.

Variations and modifications of the present invention are possible without departing from the spirit and scope of the invention as defined by the appended claims.

I claim:

1. A fluid-tight, free-rotating tubing joint, including two lengths of tubing and a coaxial barrel slidably inserted into the end regions of said lengths of tubing, said joint further comprising:
    means provided on the external surface of said barrel for sealing with each of said lengths of tubing; and
    retention means for automatically retaining said tubing lengths in axial registry with said barrel once said barrel has been fully inserted into the end regions of said tubing lengths, wherein said retention means comprises two or more sets of locking lugs with one set of lugs oriented so as to automatically grip a radially outwardly directed annular flare integrally formed from a continuous end portion of a first one of said tubing lengths, and at least one other set of lugs oriented so as to automatically grip a radially outwardly directed annular flare integrally formed from a continuous end portion of a second one of said tubing lengths, with said lugs being circumferentially spaced from each other, and with each of said lugs comprising an outwardly extending stem portion and an inwardly extending barb portion, whereby each of said annular flares will be positively retained between the stem and barb portions of one set of lugs.

* * * * *